July 31, 1923.
T. F. COSS
1,463,647
DOOR OPENING APPLIANCE
Filed March 18, 1922
2 Sheets-Sheet 1
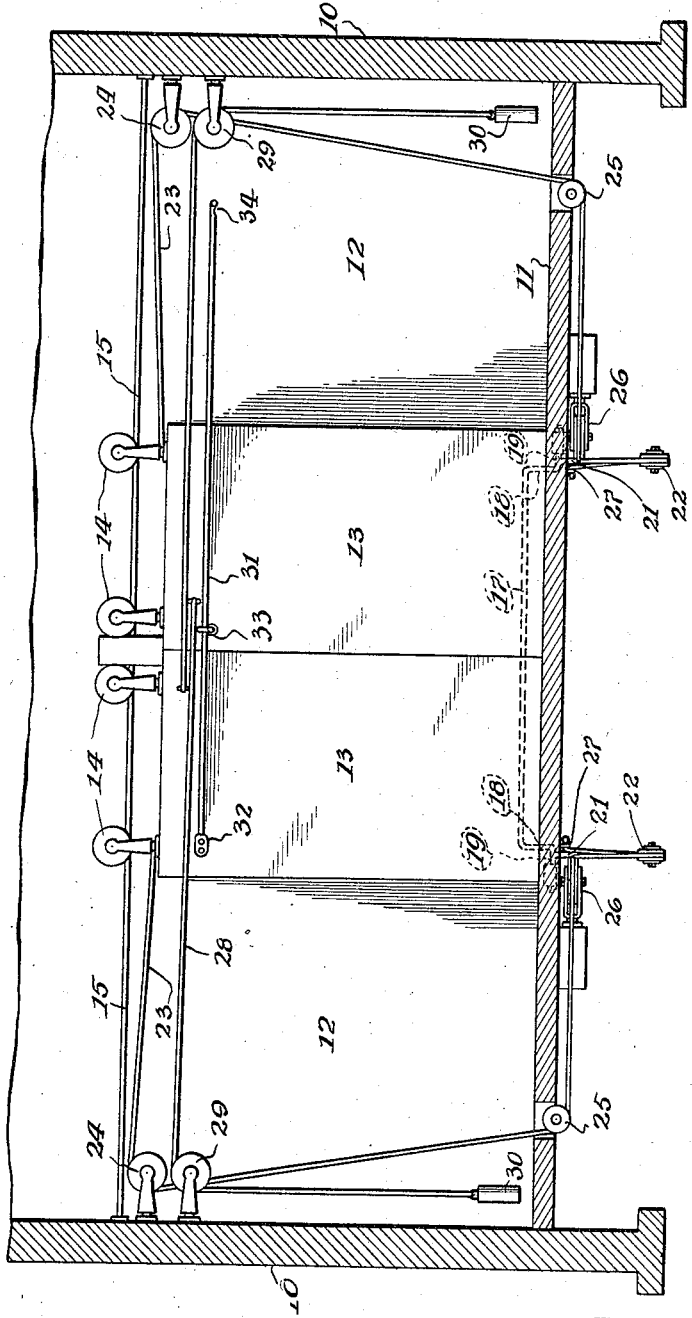
Inventor
Thomas F. Coss.
By Banning & Banning Atty's

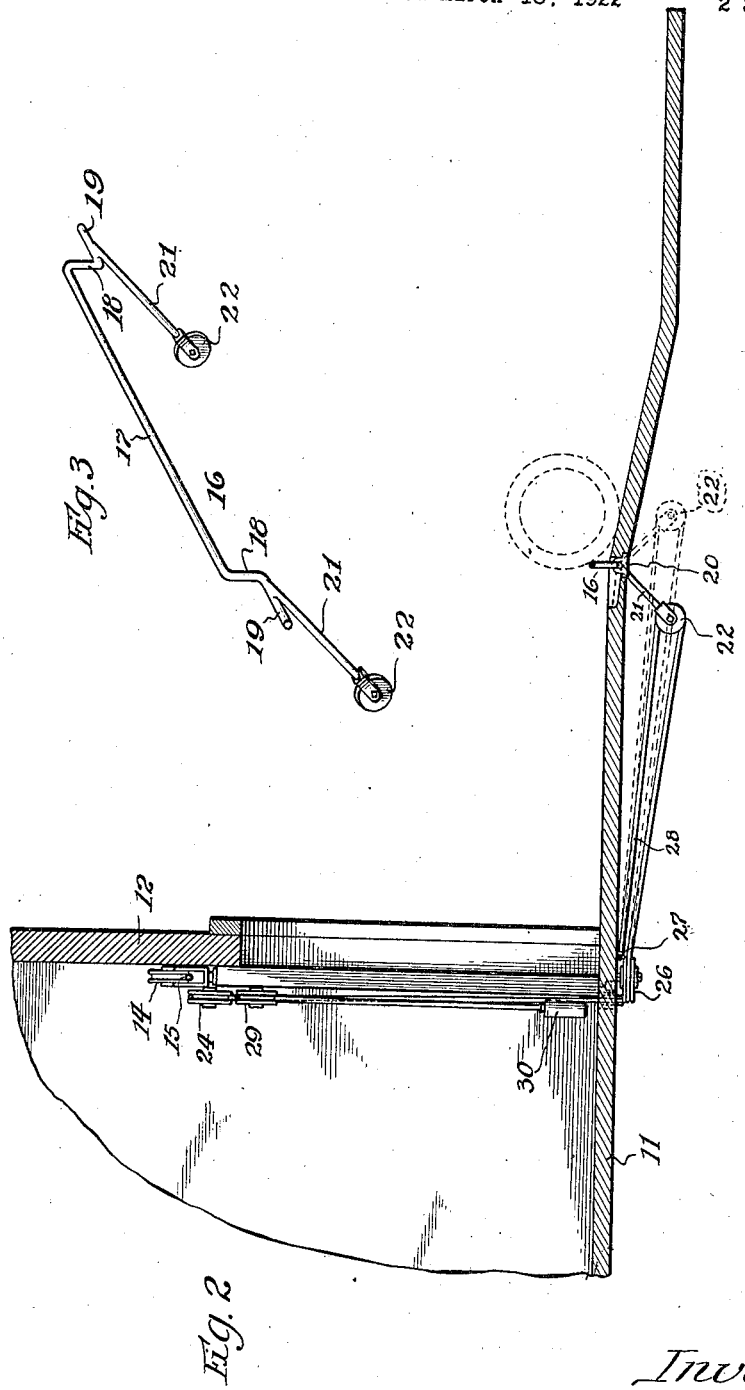

Patented July 31, 1923.

1,463,647

UNITED STATES PATENT OFFICE.

THOMAS F. COSS, OF MENDOTA, ILLINOIS.

DOOR-OPENING APPLIANCE.

Application filed March 18, 1922. Serial No. 544,779.

*To all whom it may concern:*

Be it known that I, THOMAS F. Coss, a citizen of the United States, residing at Mendota, in the county of La Salle and State of Illinois, have invented certain new and useful Improvements in Door-Opening Appliances, of which the following is a specification.

This invention relates to appliances for automatically opening the doors of garages or like establishments on the approach of an automobile or other vehicle.

The object of the invention is to so construct and arrange the contact or tread member which receives the impact of the approaching wheels that it will offer but slight surface for the accumulation of snow, mud or ice, which might interfere with its function, and so that it will not afford any substantial obstruction to a sidewalk or other public thoroughfare located intermediate the tread device and the door to be actuated.

Another object of the invention is to so construct and arrange the tread member and the cable connections leading therefrom to the doors that a relatively slight degree of movement in the tread member will be amplified to the degree requisite to fully open the doors and to the general construction and arrangement of the device as a whole.

In the drawings:

Figure 1 is a cross sectional elevation of a garage or the like, showing the interior of the doors with the cables attached;

Fig. 2 is a longitudinal sectional elevation of the front of the garage and the proximate runway, with the tread member in elevated position; and Fig. 3 is a perspective view of the tread member and associated parts.

Referring to Fig. 1, the devices of the present invention are applied to a garage having side walls 10, a floor 11, and front end walls 12 closed by door sections 13. The doors are hung from the usual rollers 14 riding on track rails 15.

The tread member 16 is located at a convenient distance in front of the doors, depending upon the arrangement of the runway which approaches the garage door opening. As shown, with the garage flush with the sidewalk, the tread member is located on the far side; that is to say, the street side of the sidewalk, so that it interferes in no way with the use of the sidewalk, although any other convenient arrangement, depending upon circumstances, may be employed.

The tread member, as shown, comprises a cross rail 17 normally held in elevated relation by end sections 18 terminating in trunnions 19 mounted in journal brackets 20, which are set into the concrete of the sidewalk, or otherwise conveniently arranged. The end sections 18 have extending therefrom at an angle thereto, arms 21 which carry rollers 22, the general arrangement being that of a bell crank lever at each end of the cross rail of the tread.

Each of the door sections has secured thereto the inner end of a cable 23 which passes over the upper idle roller 24 preferably secured to the side wall of the garage, thence around a first lower idle roller 25 located in or below the floor of the garage, thence over a second idle roller 26 similarly located, and thence around the roller 22 and back to a fixed connection at the point 27.

Each of the door sections is also provided with a counterbalancing cable 28 extending in reverse relation to the operating cable for the same door section and passing over a roller 29, and having at its lower end a counterbalance weight 30. The doors may be held against the action of the counterweights by means of a lock bar 31 secured at the end 32 of one of the door sections, which bar slidably engages a hook 33 on the other door section, and is provided on its free end with a notch 34 adapted to spring into and engage the hook 33 when the doors have been fully opened, thereby holding the same against closure by the action of the counterbalance weights.

In use, with the doors closed, the tread bar will stand in elevated relation, as best shown in Fig. 2, but when contacted by the wheels of an approaching car or vehicle the tread bar will be depressed and the arms 21 swung back into the position indicated in dotted lines. The arrangement is such that the degree of movement imparted to the cables can be regulated by properly proportioning the respective lengths of the upright members 18 and the arms 21, which act as the short and long arms of a bell crank lever. This movement will be amplified by the pulley ratio employed, so that a relatively slight degree of movement of the tread bar will afford the necessary movement for opening the doors, thereby enabling the tread member to be located in relatively close relation to the ground so as not to afford any substantial obstruction. At the same time the arrangement of the tread member is such that its operation cannot easily be interfered with by an accumulation of snow, ice or mud, which sometimes interferes with the operation of treads having a platform formation.

When the doors are fully open, the notch in the lock bar will engage the hook 33, so that the doors will remain open until the lock bar is released, after which the doors will close by the action of the counterweights.

The device is simple in construction, and is so arranged that it may be readily installed in places and under conditions which would preclude the use of devices employing platforms or depressible runways for a similar purpose.

I claim:

1. In a door opening device, the combination of a pair of sliding doors, a pivotally mounted tread bar normally standing in elevated relation with respect to the ground level of the runway, and provided at each end with a depending lever arm of greater length than the height of the tread bar, a roller journaled at the end of each lever arm, and a cable for each roller having one end secured to the associated door section and the other end secured to a fixed portion of the structure, the intermediate portion of the cable extending around the associated roller for the purpose of amplifying the movements of the door section occasioned by a swinging of the levers, substantially as described.

2. In a door opening device, the combination of a pair of sliding doors, a pivotally mounted tread bar normally standing in elevated relation with respect to the ground level of the runway, and provided at each end with a depending lever arm of greater length than the height of the tread bar, a roller journaled at the end of each lever arm, a cable for each roller having one end secured to the associated door section and the other end secured to a fixed portion of the structure, the intermediate portion of the cable extending around the associated roller for the purpose of amplifying movements of the door section occasioned by a swinging of the levers, and a counterweight for each door section acting in opposition to the door opening movements, substantially as described.

3. In a door opening device, the combination of a pair of sliding doors, a tread bar provided at its ends with vertically extending members terminating in lever arms of greater length than the vertically disposed members, pivotal mountings for the tread bar, cables extending from the arms to the respective door sections, for operating the latter by the depression of the tread bar, counterweights for each of the door sections, acting in opposition to the opening movements, and a locking bar secured to one of the door sections and slidably mounted with respect to the other door section, and adapted to engage and lock the latter when the doors have been fully opened, substantially as described.

THOMAS F. COSS.